United States Patent [19]

Noda

[11] Patent Number: 5,486,136
[45] Date of Patent: Jan. 23, 1996

[54] CUTTING MACHINE FOR RAILROAD RAIL

[75] Inventor: Hirotoshi Noda, Kanagawa, Japan

[73] Assignee: Kabushiki Kaisha Yamazaki Haguruma Seisakusho, Kanagawa, Japan

[21] Appl. No.: 451,383

[22] Filed: May 26, 1995

Related U.S. Application Data

[63] Continuation of Ser. No. 119,237, filed as PCT/JP93/00212, Feb. 22, 1993, abandoned.

[30] Foreign Application Priority Data

Jun. 15, 1992 [JP] Japan ..................... 4-180419

[51] Int. Cl.⁶ ............................ B24B 23/00; B24B 27/08
[52] U.S. Cl. ............................................ 451/347; 451/429
[58] Field of Search ....................... 451/429, 347; 269/156, 315, 277, 278, 86; 125/13.03, 14

[56] References Cited

U.S. PATENT DOCUMENTS

| | | | |
|---|---|---|---|
| 2,642,905 | 6/1953 | Hewat | 269/156 |
| 4,962,918 | 10/1990 | Yang | 269/156 |

FOREIGN PATENT DOCUMENTS

| | | |
|---|---|---|
| 25-8497 | 5/1924 | Japan . |
| 47-20778 | 9/1972 | Japan . |
| 48-110778 | 12/1973 | Japan . |
| 52-37692 | 3/1977 | Japan . |
| 53-7889 | 1/1978 | Japan . |
| 57-34355 | 2/1982 | Japan . |
| 61-284308 | 12/1986 | Japan . |
| 63-105862 | 5/1988 | Japan . |
| 206280 | 11/1923 | United Kingdom ............ 51/241 LG |

*Primary Examiner*—Bruce M. Kisliuk
*Assistant Examiner*—Derris Banks
*Attorney, Agent, or Firm*—Keck, Mahin & Cate

[57] ABSTRACT

A cutting machine for a railroad rail performs clamping by use of a screw to fasten a catch arm onto a gauge which indicates a cutting position and is fastened onto a railroad rail. The catch frame is connected to a main body block via slide shafts, and a rotating grinding disk saw, driven by an engine mounted on the main body block, is rocked by working a stroke handle to smoothly raise and lower the rotating grinding disk saw within a cut opening to cut the railroad rail crosswise. By varying the cut of the rotating grinding disk saw, frictional resistance to cutting is reduced and the generation of frictional heat is prevented, permitting use of a small-scale engine and improving the accuracy of the cut.

5 Claims, 8 Drawing Sheets

CUTTING MACHINE FOR RAILROAD RAIL

This is a continuation of Ser. No. 08/119,237, filed as PCT/JP93/00212, Feb. 22, 1993, abandoned.

TECHNICAL FIELD

The present invention relates to a railroad rail cutting machine that cuts railroad rails to specified lengths during laying or joining of railroad rails.

PRIOR ART

Cutting machines having flat, rotary grinding disk saws that are rotated by a power source to cut rails to specified lengths are employed during the laying of railroad rails and the replacement of worn rails.

However, since conventional cutting machines are of a configuration whereby the main body is clamped to the railroad rail and the grinding disk saw is advanced in a specified single direction while the grinding disk saw is rotated, the entire width of the head of the rail is cut crosswise without changing the contact position of the grinding disk saw with respect to the railroad rail.

In such a cutting method, since the grinding disk saw continuously rotates keeping the same cutting line as given at first contact, not only the rail generates a high temperature of frictional heat is generated and consequently hardens, but also a large engine is required to drive the rotary grinding disk saw. Then, vibration is readily transmitted to the rotary grinding disk saw and substantial cutting pressure is needed, which causes widened and deflected cuts, impeding high-precision cutting.

The present invention, devised out of the need to address such drawbacks of the prior art, has its object to provide a high-performance rail cutting machine wherein high-precision cutting is performed with a narrow cut to prevent hardening of the rail, a small, light power source is used for easy handling, and the positioning of cutting machine is easily made.

DESCRIPTION OF THE INVENTION

In a cutting machine for railroad rail according to the present invention, a rail clamping means is configured wherein a railroad rail 5 of specified cross section is cross clamped on two sides, this being achieved by means of a clamp arm 4 supported for rotation by a catch frame 3. A clamp position is determined by tightening the lower end 8c of a clamp screw 8, which is threaded vertically down through a threaded cylinder sleeve 4b, positioned on the upper surface of clamp arm 4, and has a turning handle 8a, onto a countersink 9a on the surface of a gauge 9 removably secured on the surface of railroad rail 5 for indicating the cutting position. Rail clamping means is further comprised by rail holding abutments members 6a–6c positioned on catch frame 3 for holding the railroad rail 5 with significant vertical and horizontal pressure applied perpendicularly to the railroad rail 5 and a lower jaw 4a provided on the clamp arm 4. Two slide shafts 2, 2, which are juxtaposed horizontally and supported for sliding movement relative to catch frame 3 by main body 1, are secured at their ends and so as to extend perpendicularly as well as horizontally with respect to railroad rail 5. A stroke handle 11, extending upward and swingably supported by catch frame 3, is connected at the middle to main body 1 by a connecting bar 12 so as to swing relative to main body 1. A cutting arm 17, extending laterally with respect to catch frame 3 to the upper part of main body 1, is adapted to swing vertically with respect to the direction of movement of slide shafts 2, 2 and to provide a uniform cutting pressure by means of the resilience of springs. This cutting arm 17 is provided with an arm handle 26 attached thereto to hold down. A grinding disk saw 30, which is rotated by a power source and forms a crosswise cut in railroad rail 5 corresponding to cut position 10 indicated by gauge 9, is detachably mounted on the forward end of cutting arm 17 so that an angle of about 45° is formed between the upper surface of railroad rail 5 and the radius extending from the axis of rotation B of grinding disk saw 30 to a point of contact C at which grinding disk saw 30 contacts with the corner of railroad rail 5 and that the cutting position of railroad rail 5 by grinding disk saw 30 can be continuously varied during a single cut of railroad rail 5 through forward and backward strokes of stroke handle 11.

Moreover, the clamping means provided on catch frame 3 can also be of a configuration comprising rail jaw abutments 6b, 6b, juxtaposed opposite the lower end of clamp screw 8c to hold the tapered rail jaw 5b of rail 5 with a substantial pressure from both above and below, medial rail abutments 6a, 6a, juxtaposed opposite the lower jaw 4a of clamp arm 4 to hold the medial part of the rail 5a with a substantial pressure, and a rail top abutment 6c positioned on the same side as medial rail abutments 6a, 6a to support the side of the rail top 5c of rail 5.

BEST EMBODIMENT OF THE PRESENT INVENTION

Figure 1:
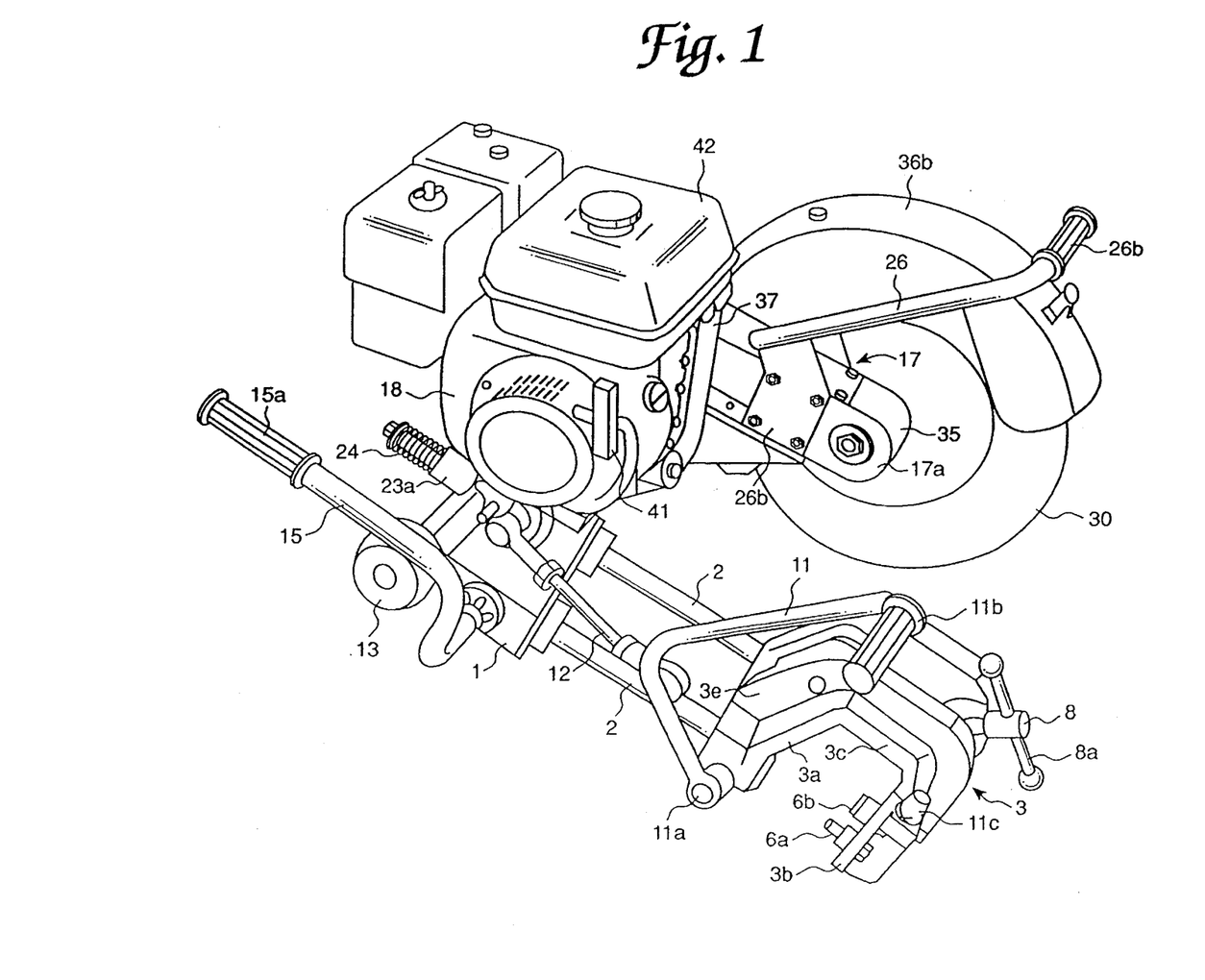
FIG. 1 is an overall perspective view of the cutting machine for railroad rail of the present invention of the present invention.
Figure 2:
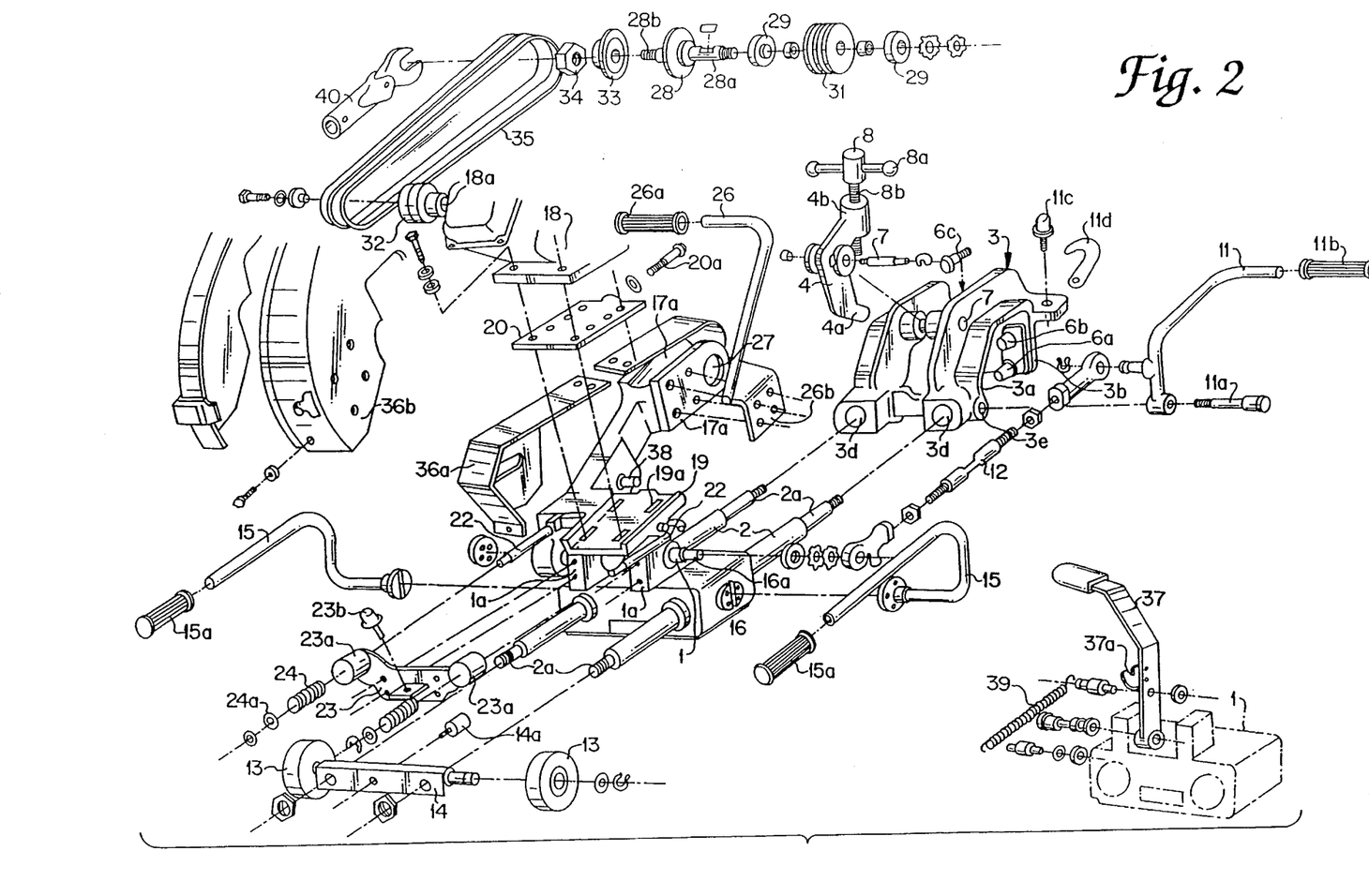
FIG. 2 is an exploded perspective view of the cutting machine of the present invention.

In FIGS. 1 and 2, the main body block, which is denoted by 1, is provided with juxtaposed two slide shafts 2, 2, horizontally separated by a space, to slide. In addition to passing through main body block 1 from front to back, both ends 2a, 2a of each of these slide shafts 2, 2 are threaded.

Figure 3:
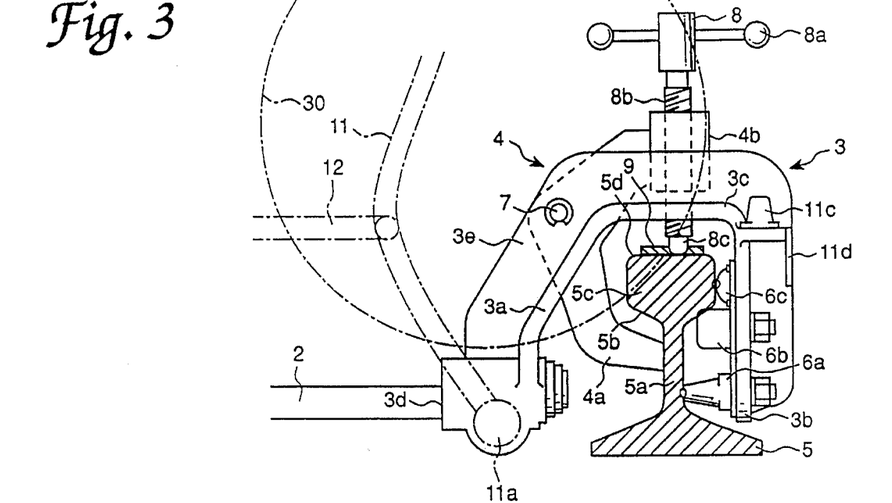
FIG. 3 is a side view of a railroad rail clamp mechanism of the cutting machine of the present invention.

As shown in FIG. 3, catch frame 3, which has a generally U-shaped longitudinal section formed by front and back wall surfaces 3a, 3b and a ceiling surface 3c, is formed with through holes 3d, 3d side by side in the back wall 3a as viewed when its open side is faced downward, (the left side as viewed in FIGS. 1 and 3). The threaded parts 2a, 2a at the front ends (the right side as viewed in FIGS. 1 and 3) of slide shafts 2, 2, are fastened by nuts in said through holes 3d.

In this instance, through holes 3d, 3d are formed so that slide shafts 2, 2 fastened in through holes extend perpendicularly with respect to front wall surface 3b of catch frame 3.

Various supports are provided along one side of the front wall 3b of catch frame 3 which faces one longitudinal surface of railroad rail 5 of specific cross section held between wall surfaces 3a and 3b. That is, as the position and direction of these rail supports are indicated by arrows in FIG. 5, the medial part of the rail 5a is supported horizontally at two points, the upper jaw of the rail 5b is supported horizontally at two points, and the side surface of the rail top 5c is supported at one central point. Moreover, as shown in FIG. 3, the rail support means, comprised of the two juxtaposed medial rail abutments 6a, 6a, the two juxtaposed rail jaw abutments 6b, 6b, and the single rail top abutment 6c, is configured so as to bring front wall surface 3b into uniform contact perpendicularly along railroad rail 5.

Generally U-shaped clamp arm 4, having lower jaw 4a positioned below and threaded cylindrical sleeve 4b above is installed in the space 3d formed lengthwise between catch frames 3, and the curved portion of clamp arm 4 is supported for swing movement by a shaft 7 extending through two flange members 3e, 3e of catch arm 3. The threaded part 8b of a clamp screw 8 is screwed vertically down through threaded cylindrical sleeve 4b by turning handle 8a located above so as to effect the lower end 8c to extend downward.

During cutting of railroad rail 5, the lower end 8c of clamp screw 8 is fitted into a countersink 9a bored in a specific position in the upper surface of gauge 9 which is used to indicate a cutting position. That is, in order to cut a railroad rail 5 crosswise, after gauge 9 has been mounted on the surface of railroad rail 5 prior to cutting, and by tightening clamp screw 8 to bring its lower end 8c itself into abutment with the countersink 9a of gauge 9, the cutting machine is automatically positioned and secured in the position on railroad rail 5.

As shown in FIG. 3, a line projected vertically downward through the lower end 8c of clamp screw 8 is located at approximately the center between medial rail abutments 6a and top rail abutment 6b. This configuration permits clamp screw 8 to be tightened in a stable manner.

Figure 4:
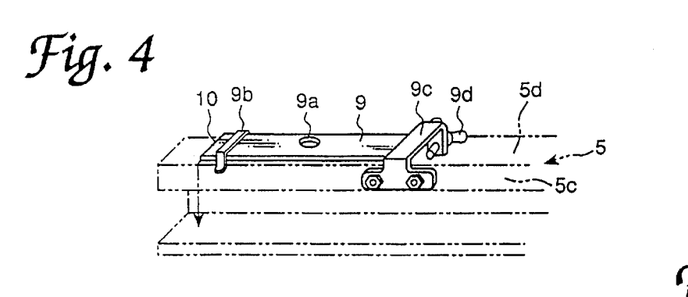
FIG. 4 is a perspective view of a gauge, used with the cutting machine of the present invention to indicate a cut position, shown mounted on the upper surface of the railroad rail.

As shown in FIG. 4, gauge 9 has a clamping strip 9b, secured to one end of a flat plate, which is tightly fastened onto the upper surface 5d of railroad rail 5 of specified width from above, and a high-pressure clamping strip 9c, secured to the other end, which is fastened onto railroad rail 5 in a similar manner to fastening the clamping strip 9b. With a wing-type fastening screw 9d, one side of high-pressure clamping strip 9c is fastened to the side surface of the top rail part 5c. The end of the flat plate on the side of the clamping strip 9b indicates the cutting position 10.

A expected cutting line corresponding to the cutting position 10 is accurately perpendicular to the lengthwise direction of railroad rail 5. Countersink 9a bored in the upper surface of gauge 9 is positioned corresponding to the lower end 8c of clamp screw 8.

Figure 5A:
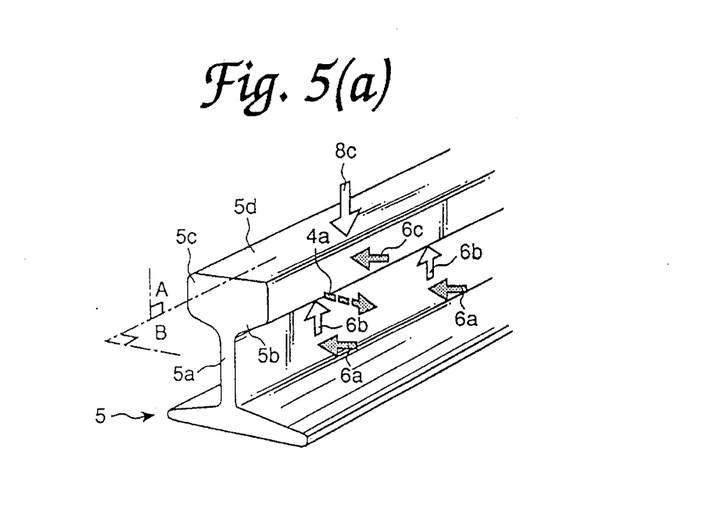
FIG. 5 is a explanatory perspective view showing the clamped condition of the cutting machine of the present invention.
Figure 5B:
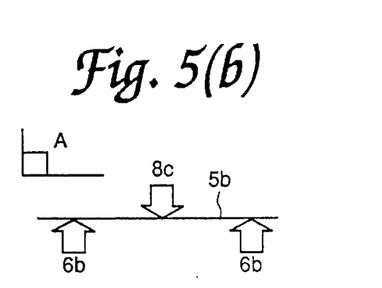
Figure 5C:
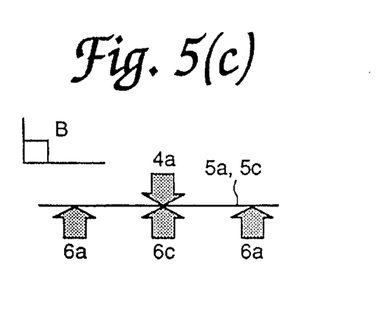

Thus, as shown in FIG. 5, by tightening clamp screw 8, the rail head 5c is tightly clamped from above and below by rail top abutments 6b, 6b (double point support) opposite the lower end 8c of clamp screw 8 (single point support). At the same time, the medial part of rail 5a is clamped by medial rail abutments 6a, 6a (double point support) on catch frame 3, and the side of the rail head 5c is clamped on the same side by rail head abutment 6c (single point support). Against these three point support from one side of the railroad rail 5, the medial part of rail 5a is firmly held by lower jaw 4a (one point support) of clamp arm 4 from the other side.

As a result, railroad rail 5 can be clamped perpendicularly in vertical and horizontal directions by simply tightening the single catch frame 3 onto countersink 9a of gauge 9, and main body 1 can be slid both perpendicularly and horizontally with respect to the length of railroad rail 5.

There are illustrations on the right side of FIG. 5 showing the characteristic of perpendicular clamping of railroad rail 5 for vertical and horizontal components.

Located to one side of catch frame 3 and in close proximity to where slide shafts 2, 2 are secured, stroke handle 11, extending upward, is supported for swing movement by shaft 11a. Protruding member 16a of a support shaft 16, which is provided so as to extend from the side of upper support members 1a, 1a of main body 1, is connected to the middle of stroke handle 11 by connecting bar 12 so as to be movable relative to each other.

With this configuration, once catch frame 3 has been fixed to railroad rail 5, main body 1 can be horizontally advanced or withdrawn with respect to railroad rail 5 by moving stroke handle 11 forward or backward by hand. Designated at 11b is gum rubber slipped over stroke handle 11. Stroke handle 11 can be locked in the forwardly inclined position by being hooked on a handle hook 11d through a stopper 11c positioned on a laterally protruding member of catch frame 3.

The threaded portions 2a, 2a of the ends of slide shafts 2, 2 located opposite to catch frame 3 are anchored in a support member 14 which is equipped with wheels 13, 13 on both ends. This support member 14 is provided with a stopper 14a attached thereto on the side of main body 1 to lessen the impact on support 14 when main body 1 moves forward or backward. Further, carrying handles 15, 15 are secured to both sides of main body 1. Designated at 15a is gum rubber slipped over the end of each carrying handle 15.

Designated at 17 is a cutting arm, mounted for swing movement on support members 1a, 1a on the upper part of main body 1 through a support shaft 16, which is mounted so as to swing perpendicularly to the lengthwise direction of railroad rail 5 once catch frame 3 has been clamped on railroad rail 5 in the manner set forth above.

Cutting arm 17 is configured to have a free end protruding toward catch frame 3. A support plate 19 is provided in a position where cutting arm 17 is pivoted, i.e. above main body 1. To this support plate 19, an engine 18 for driving is bolted through an intermediate plate 20 so as to place its output shaft 18a to face cutting arm 17. This engine 18 can be of a combustion type or an electric motor. The engine shown in the drawings is of a combustion type and is provided with necessary devices such as fuel tank 42, starter lever 41, etc.

Means for mounting engine 18 is comprised by, in addition to elongating bolt holes 19a on support plate 19 in the lengthwise direction to form slots, adjustment bolt 20a threaded into the front of intermediate plate 20. The lengthwise position of engine 18 is adjusted by screwing in and out the bolt.

Cylindrical members 23a, 23a are provided on both ends of an attachment plate 23 facing support shafts 22, 22 which protrude toward the rear on both sides of support plate 19. In addition to housing the ends of coil springs 24, 24 in the cylindrical members 23a, 23a and inserting support shafts 22, 22 through coil springs 24, 24, the ends of support shafts 22, 22 are held and secured by washers 24a24a, preventing slipping off of coil springs 24, 24. Furthermore, the lower side surface of attachment plate 23 is bolted to the back surface of support members 1a, 1a of main body 1.

Stopper 23b, extending upward, is secured via a bracket to the side of attachment plate 23 and is adapted to abut against the bottom of support plate 19 so as to restrict the amount of travel of cutting arm 17 to the rear while cutting arm 17 swings toward the rear.

Prong plates 17a, 17a are attached to the free end of cutting arm 17, inner one of which is attached by a date 26b to an upward extending arm handle 26. Designated at 26a is gum rubber slipped over arm handle 26. Arm handle 26 thus configured can be locked in the forwardly declined position by hooking it on a handle hook 26d via a stopper 26c positioned on a protruding side member of catch frame 3.

Cutting arm 17 is formed with mounting holes 27, 27 in prong plates 17a, 17a to permit installation of flanged rotary shaft 28 for rotation. Flanged rotary shaft 28 is inserted into mounting holes 27, 27 leaving the flange portion exposed on the exterior. Pulley 31 is secured between mounting holes 27, 27 on shaft member 28a protruding from the inner side of rotation shaft 28 so as to rotate together with shaft member 28a. Bearings 29, 29 are positioned on both sides of pulley 31, and the end of shaft member 28a is secured with a nut fitting bearings 29, 29 against mounting holes 27, 27 on prong plates 17a, 17a. On the other shaft member 28b, flat grinding disk saw 30 is abutted against the flange portion of flanged rotary shaft 28 and detachably secured to the shaft 28 from the outside via a flange 33 with a nut 34.

Belt 35 is then placed over pulley 31 positioned between prong plates 17a, 17a and pulley 32 secured on output shaft 18a of engine 18. In this configuration of grinding disk saw 30, according to swing movement of cutting arm 17 is caused to be perpendicular to railroad rail 5, the grinding disk saw 30 is attached so that the cut of grinding disk saw 30 is positioned to be perpendicular to the lengthwise direction of railroad rail 5. A cover 36a of belt 35 and a cover 36b of grinding disk saw 30 are mounted on cutting arm 17.

Since it is sometimes necessary in such a configuration to rock cutting arm 17, an arm rock lever 37 is supported for swing by a shaft on the top of main body 1 as shown at the lower right of FIG. 2. This arm rock lever 37 is also linked to main body 1 via spring 39. Rocking of arm rock lever 37 is accomplished when a notched tab 37a secured to the middle of arm rock lever 37 automatically catches on a small shaft 38 protruding in close proximity to the support of cutting arm 17. To release the rocking, arm handle 26 is slightly raised so as to shift cutting arm 17 upward, and then, arm lock lever 37 is pulled forward so as to release the engagement between notched tab 37a from shaft 38.

Figure 6:
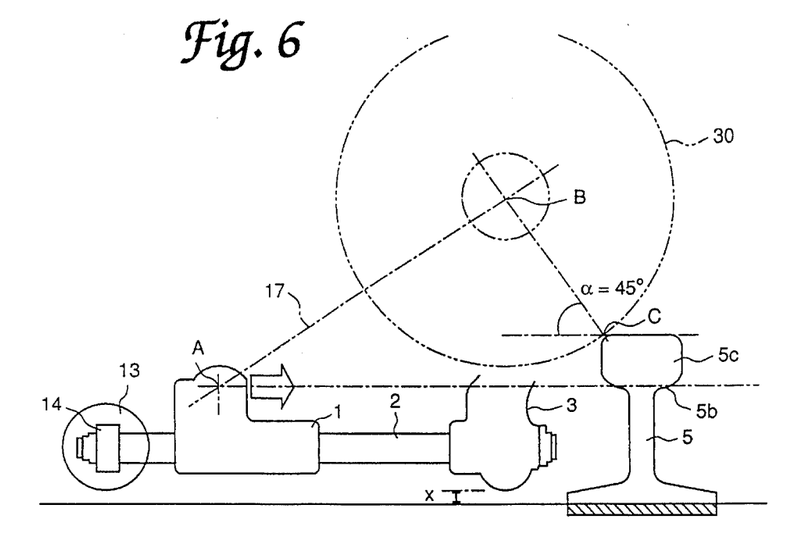
FIG. 6 is a schematic side view showing the mounting position of the main body block of the cutting machine of the present invention.

In the configuration set forth above, as shown in FIG. 6, once cutting arm 17 swinging about the pivot axis A (support shaft 16) is positioned so as to provide an angle of approximately 45° formed between the upper surface of railroad 5 and the radius of grinding disk saw 30 from the axis of rotation B to the point C where grinding disk saw 30 contacts with the corner of railroad rail 5, while cutting arm is forced to swing about support shaft 16, it varies in position due to its own weight and forces exerted by coil springs 24, 24, so as to provide an uniform cutting pressure to the cut in railroad rail 5 through grinding disk saw 30. By moving main body 1 forward and backward, rotating grinding disk saw 30 is smoothly raised and lowered along the cut in railroad rail 5.

Furthermore, in the configuration, set forth above, when the axis of rotation A of cutting arm 17 is fixed as far below from the upper part of the rail top 5c, the location of the axis of rotation A approaches closer the horizontal center of railroad rail 5 along the entire length, so that an uniform distance is provided between the axis of rotation A and railroad rail 5. This is advantageous in that it becomes possible to use the same stroke on stroke handle 11, simplifying operation.

However, in this instance, a certain clearance X between the lowest position of catch arm 3 and the surface of the ground is desirable to permit direct cutting of rails already secured in position.

The effect and operation of the cutting machine for railroad rail of the configuration set forth above will now be described in reference to FIGS. 8–14.

Figure 8:
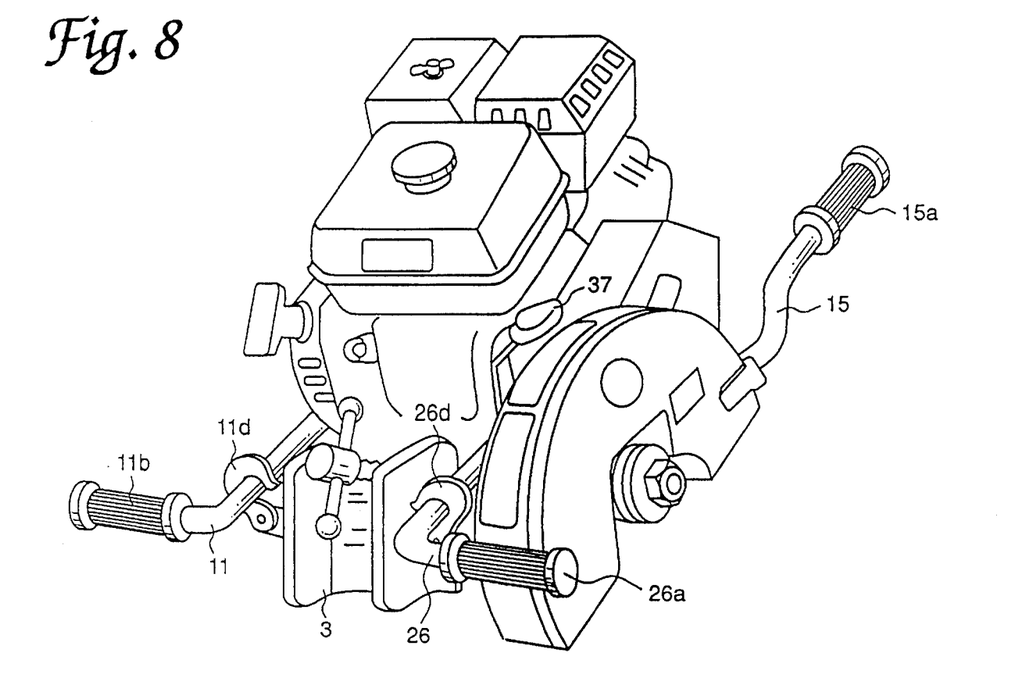
FIGS. 8 through 14 are perspective views illustrating the operation of the cutting machine of the present invention.

In FIG. 8, when transporting the cutting machine of the present invention, stroke handle 11 and arm handle 26 are first engaged and locked by handle locks 11d and 26d, respectively. One person then lifts stroke handle 11 and arm handle 26, and another person lifts both carrying handles 15, 15.

Figure 9:
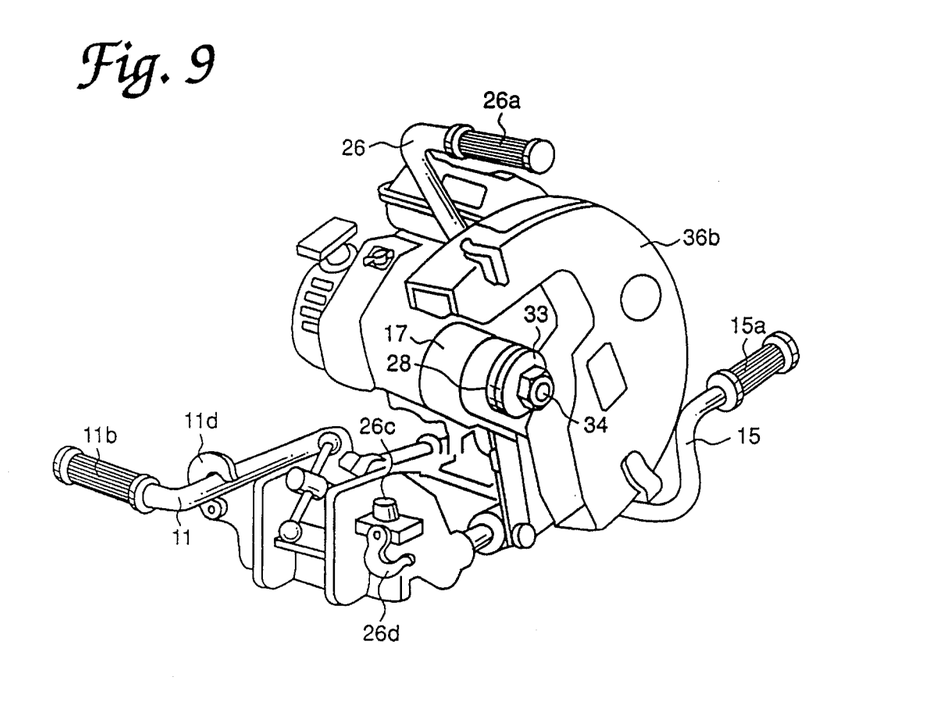
Figure 10:
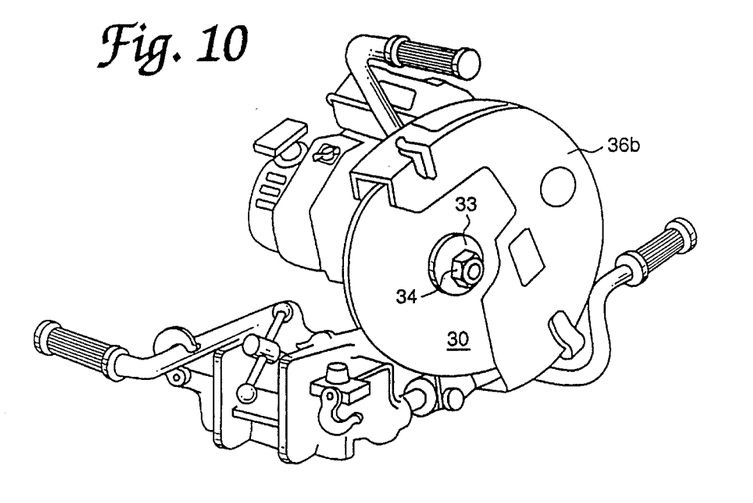

Next, in FIG. 9, handle lock 26d on arm handle 26 is released and arm handle 26 is raised. Notched tab 37a on arm lock lever 37 then catches and locks shaft 38 of cutting arm 17, fixing cutting arm 17 in a raised position. Grinding disk saw 30 is then placed on shaft member 28a of flanged rotary shaft 28 and, as shown in FIG. 10, secured with nut 34 via flange 33 using a wrench 40.

Figures 11A, 11B:
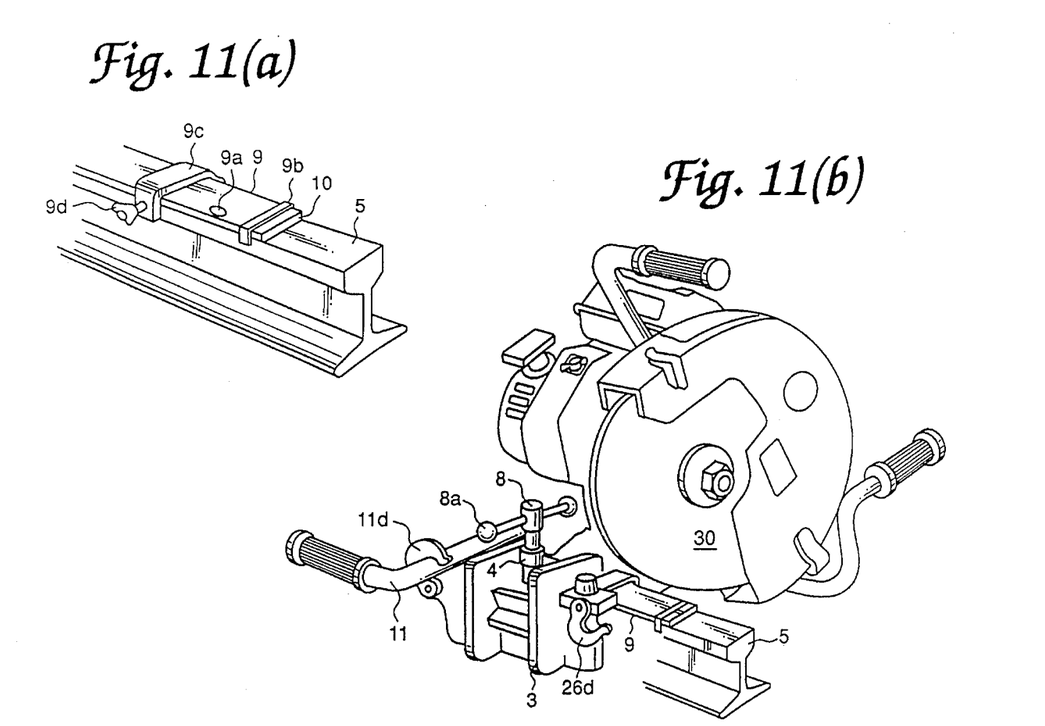

Subsequently, as shown in FIG. 11, gauge 9 is mounted on the railroad rail to be cut. At this time, the cutting position 10 indicated by gauge 9 is aligned with the intended cutting line on railroad rail 5. Thereafter, while the cutting machine main body is lifted and seated on railroad rail 5, the lower end 8c of clamp screw 8 is fitted into countersink 9a of gauge 9, and clamp screw 8 is then tightened.

During setting up, if the person who holds carrying handles 15, 15 lightly rocks the cutting machine main body while tightening clamp screw 8, the two medial rail abutments 6a, 6a, the two rail jaw abutments 6b, 6b, and the one rail top abutment 6c on the catch frame 3, and lower jaw 4a of clamp arm 4 are uniformly seated at desired points on railroad rail 5 and a right angle clamping is achieved.

Figure 12:
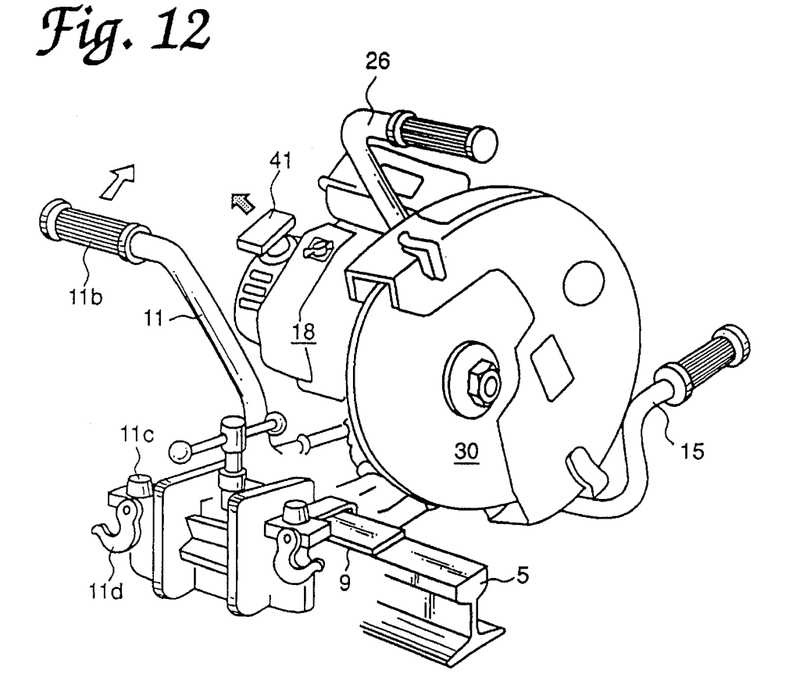
Figure 13:
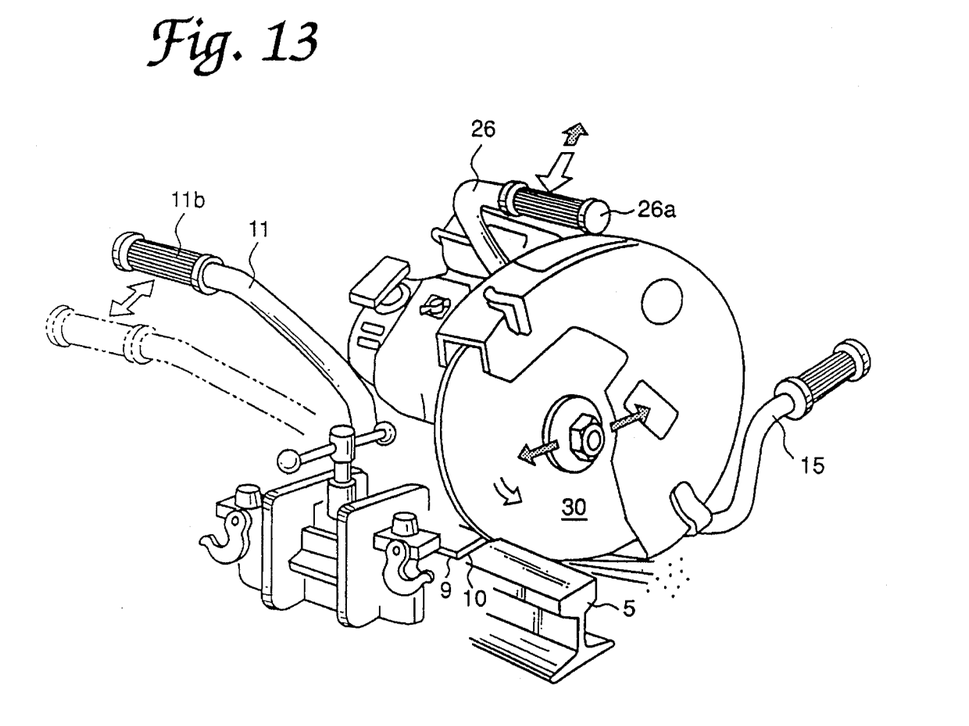

Then, as shown in FIG. 12, when handle hook 11d of stroke handle 11 is disengaged and arm handle 26 is raised, grinding disk saw 30 is moved away from railroad rail 5. Under this condition. engine 18 is then fired and left idling.

Subsequently, after having gradually increased the engine speed so as to bring grinding disk saw 30 into stable rotation without vibrations, as shown in FIG. 12, arm handle 26 is slightly raised (in the direction of the black arrow in FIG. 12) and arm lock lever 37 is pulled forward to free cutting arm 17. While arm handle 26 is then steadily lowered (in the direction of the white arrow in FIG. 13), grinding disk saw 30 is brought into contact with the upper part of the rail 5c. The engine is fully powered up once a small cut has been made in the top part of rail 5c.

While holding arm handle 26 enough to prevent grinding disk saw 30 from rocking up and down, stroke handle 11 is moved back and forth about 30 cm at intervals of 1–2 seconds to cut the railroad rail.

Figure 7A:
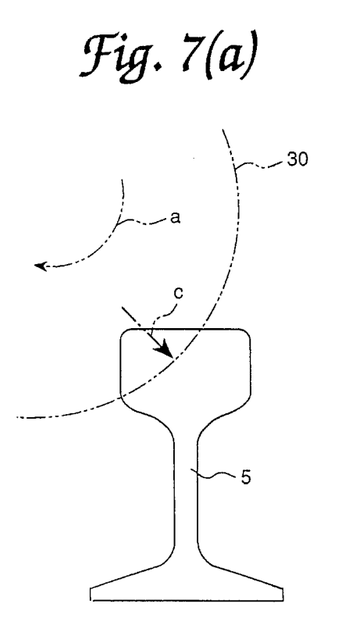
FIGS. 7(a)–(c) are illustrations showing the change in cut of the rotary grinding disk saw of the cutting machine of the present invention.
Figure 7B:
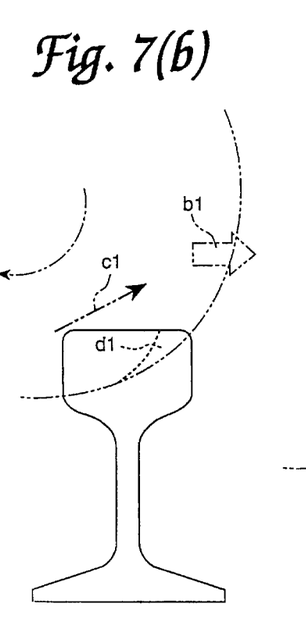
Figure 7C:
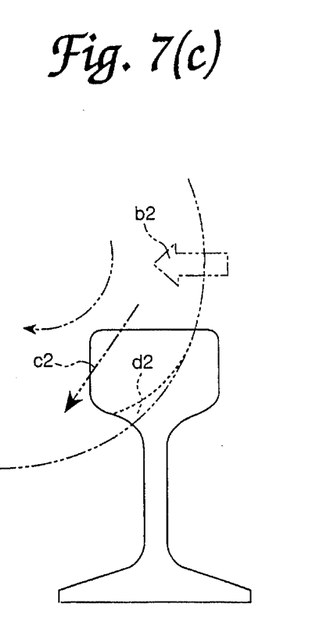

As shown in FIG. 7(b), in this operation of cutting operation, when stroke handle 11 is pulled forward (toward the operator) while the rotating grinding disk saw 30 is rotating in the direction of arrow a, as grinding disk saw 30 moves in the direction of arrow b1, the cutting position of rotating grinding disk saw 30 rises smoothly as shown at c1. Upper corner d1 is cut with a slight length of cut, after which stroke handle 11 is pushed back (away from the operator) to move grinding disk saw 30 in the direction of arrow b2 as grinding disk saw 30 smoothly drops, as shown at c2, steadily cutting the center portion protruding in the middle and the lower portion d2.

By moving stroke handle 11 back and forth in this manner, the cut d1–d2 of rotating grinding disk saw 30 is continuously varied, changing the areas in which frictional heat is generated. Moreover, since the contact length of rotating grinding disk saw 30 is reduced to d1–d2 while cutting advances, little torque is required of the rotating grinding disk saw. By way of comparison with the present invention, when the cut of a rotating grinding disk saw 30 rotating in direction a as shown in FIG. 7 (a) is not varied, continuously remaining in the same position, frictional heat is generated and the contact length of rotating grinding disk saw 30 in the cut increases with the total width of railroad rail 5 to a level where a much higher degree of grinding disk saw torque becomes necessary.

Figure 14:
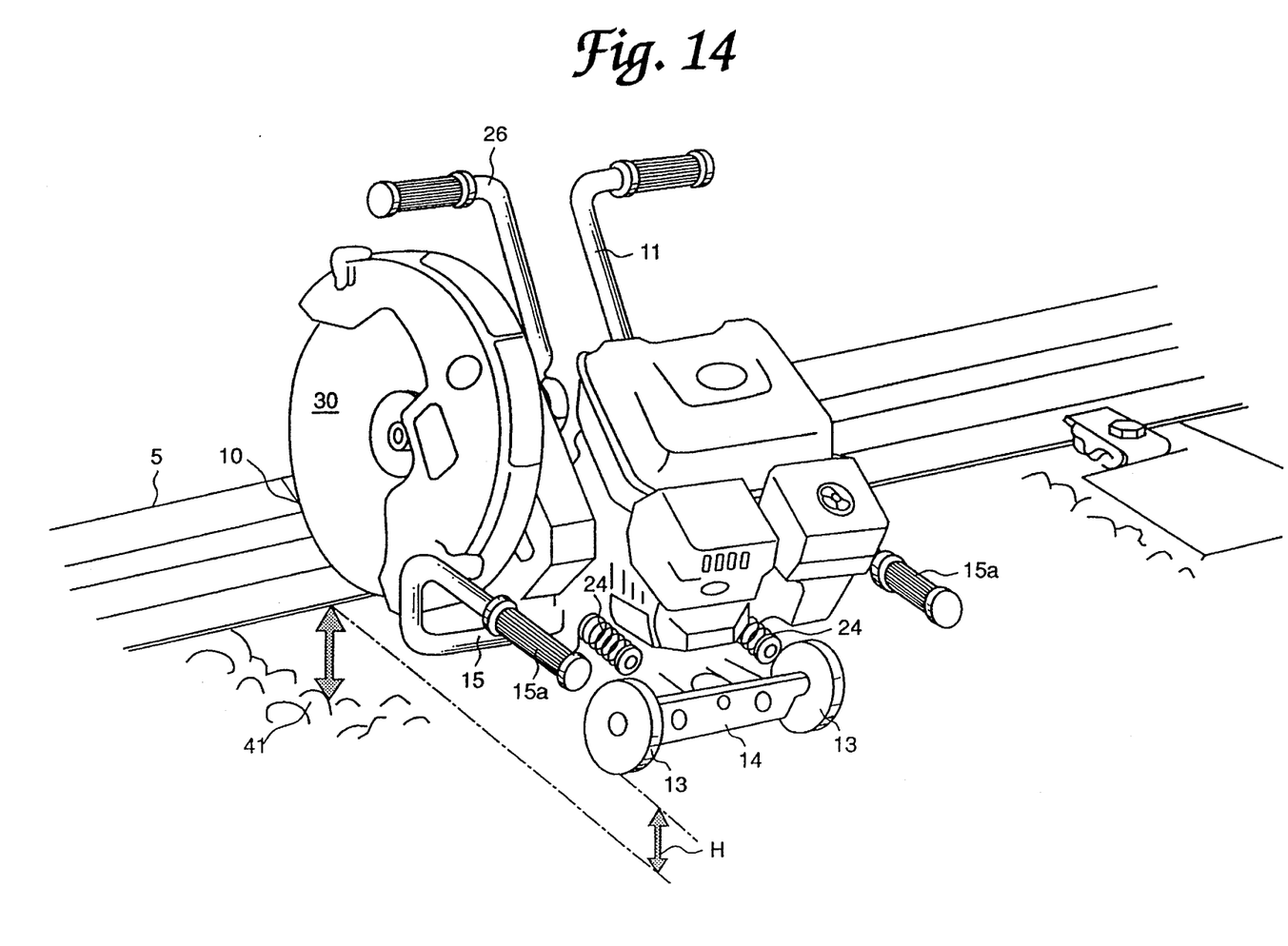

FIG. 14 shows the back of the present cutting machine mounted on a railroad rail 5. As set forth above, since the present cutting machine is clamped in a position higher than the bottom of railroad rail 5 as indicated by an arrow H, the railroad rail 5 can be cut without being detached. However, removal of ballast 41 to a depth of 10 cm below the location of the cut made by the rotating grinding disk saw is desirable.

Potential for Industrial Application

According to the present invention as described above, when cutting rails to specific lengths, the cutting machine is readily positioned on the rail for a given cut and clamped in place, is suitable for cutting railroad rails where they have been laid, and is convenient for emergency railroad rail replacement.

In the cutting operation, by moving the stroke handle back and forth, the rotating grinding disk saw is smoothly raised and lowered within the cut, varying the cutting position of said rotating grinding disk saw. In this manner, not only is the frictional heat associated with cutting reduced, but cutting advances with only minimal contact length of the rotating grinding disk saw within the cut. The rail is therefore not hardened, permitting cutting with much less torque. Since a small, light power source can thus be used, the rotating grinding disk saw has no propensity for deflection, and thin, precise cuts are made.

Weight reduction also simplifies operations such as transport, handling and setting.

I claim:

1. A cutting machine for cutting railroad rails comprising:

clamping means for clamping a railroad rail from both transverse sides of said railroad rail;

a pair of juxtaposed guide rods secured to and extending in parallel from said clamping means, said guide rods being brought into horizontal and perpendicular placement relating to a lengthwise direction of said railroad rail when said clamping means clamps said railroad rail;

a main body mounted for slide movement on said juxtaposed guide rods;

a cutting arm having a support bracket defined at a first end thereof, pivotally mounted on said main body;

an engine supported on said support bracket and secured to said main body by said support bracket;

a grinding disk saw supported at a second end of said cutting arm;

means for operationally coupling said grinding disk saw to said engine;

a stroke handle pivotally connected to said clamping means; and connecting means, pivotally connected at one end to said main body and at another end to said stroke handle, for transferring movement of said stroke handle to said main body to produce said slide movement;

said slide movement bringing said grinding disk saw into and out of engagement with said railroad rail.

2. A cutting machine as defined in claim 1, wherein said clamping means comprises a catch frame secured to said juxtaposed guide rails and a clamp arm supported for pivotal movement by said catch frame so as to hold the railroad rail from both transverse sides of said railroad rail.

3. A cutting machine as defined in claim 2, wherein said clamping means further comprises a clamp screw mounted on said clamp arm, said clamp screw being tightened to firmly clamp said railroad rail with said catch frame and said clamp arm.

4. A cutting machine as defined in claim 1, and further comprising urging means, disposed between said main body and one end of each of said guide rods, for forcing said support bracket to turn said arm and move said grinding disk saw away from said railroad rail.

5. A cutting machine as defined in claim 4, and further comprising an arm handle, attached to said cutting arm, for pivoting said engine and said cutting arm relative to said main body and adjusting said engagement with said railroad rail.

* * * * *